(12) United States Patent
Tiku et al.

(10) Patent No.: US 10,599,495 B2
(45) Date of Patent: Mar. 24, 2020

(54) TRIGGERING OF DISTRIBUTED DATA DELETION

(71) Applicant: American Express Travel Related Services Company, Inc., New York, NY (US)

(72) Inventors: Sripriya Tiku, Scottsdale, AZ (US); Fred Bishop, Glendale, AZ (US); Diane Derocher, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 183 days.

(21) Appl. No.: 15/594,210

(22) Filed: May 12, 2017

(65) Prior Publication Data

US 2018/0329940 A1 Nov. 15, 2018

(51) Int. Cl.
*G06F 16/00* (2019.01)
*G06F 9/54* (2006.01)
*G06F 16/21* (2019.01)
*G06F 21/62* (2013.01)
*G06Q 30/02* (2012.01)

(52) U.S. Cl.
CPC .............. *G06F 9/546* (2013.01); *G06F 16/21* (2019.01); *G06F 21/6245* (2013.01); *G06F 2221/2143* (2013.01); *G06Q 30/02* (2013.01)

(58) Field of Classification Search
CPC ....................................................... G06F 16/21
USPC ......................................................... 707/692
See application file for complete search history.

(56) References Cited

U.S. PATENT DOCUMENTS

| | | | |
|---|---|---|---|
| 9,361,304 B2* | 6/2016 | Hobart | G06F 16/125 |
| 9,575,977 B1* | 2/2017 | Bergman | G06F 16/128 |
| 10,140,343 B2* | 11/2018 | Parikh | G06F 16/2465 |
| 2006/0143476 A1* | 6/2006 | McGovern | G06F 21/6218 |
| | | | 713/191 |

* cited by examiner

*Primary Examiner* — Chelcie L Daye
(74) *Attorney, Agent, or Firm* — Thomas Horstemeyer, LLP

(57) ABSTRACT

A data deletion system may trigger and orchestrate data deletion of data across various data stores. The system may schedule a record having a unique identifier for deletion in response to a data deletion rule. The record may be deleted from a system of record based on the unique identifier. The system may broadcast a deletion message containing the unique identifier. The deletion message may trigger a purge of data associated with the unique identifier by a subscribing entity such as, for example, an application or third party. The system may monitor the subscribing entity to determine whether the purge was successfully completed.

20 Claims, 5 Drawing Sheets

TRIGGERING OF DISTRIBUTED DATA DELETION

FIELD

This disclosure relates to systems and methods for triggering and coordinating data deletion across distributed data stores.

BACKGROUND

Data privacy concerns increase with the prevalence of data-driven applications and the resultant data collection. Many governments implement rules for data collection, management, and deletion. However, these rules are inconsistent across varied jurisdictions. For example, data privacy rules in Europe vary significantly from those in the North America. Data privacy rules may even vary from state to state, or from province to province. Therefore, companies providing software and electronic services are challenged with managing data collected and used in different jurisdictions under different rules.

A variety of applications may operate based on the data collected and maintained under these rules. For example, data may be collected and stored in a central repository in association with individuals. Various applications may duplicate portions of the data to support the operation of the applications. For example, a financial institution may collect data associated with account holders in conjunction with their accounts. The financial institution may offer additional services supported by the same data. The additional services may use a different data storage format to facilitate faster access, for example, containing copied data. Although the original data associated with the transaction account holder may be deleted according to applicable rules, the copy of the data maintained to support additional services may not be deleted.

SUMMARY

A system, method, and computer readable medium (collectively, the "system") is disclosed for triggering deletion of data across various data stores. The system may schedule a record having a unique identifier for deletion in response to a data deletion rule. The record may be deleted from a system of record based on the unique identifier. The system may broadcast a deletion message containing the unique identifier. The deletion message may trigger a purge of data associated with the unique identifier by a subscribing entity such as, for example, an application or third party. The system may monitor the subscribing entity to determine whether the purge was successfully completed.

In various embodiments, broadcasting the deletion message may include writing the deletion message to a messaging queue. The system may monitor the messaging queue to detect consumption of the deletion message from the messaging queue. An alert may be generated in response to the deletion message remaining in the messaging queue. The system may apply a hold to a second record having a second unique identifier to prevent deletion of the second record in response to the data deletion rule. The system may also receive a list of unique identifiers associated with non-purged records retained by the subscribing entity. The unique identifier may include, for example, an account number associated with a transaction account. An alert may be generated in response to failure of a periodic audit to trigger further action. The system may further store a history comprising the unique identifier associated with the purged data. The system may have rules and schedules that vary by legal jurisdiction, market, account status, or other criteria. For example, deletion rules may differ for accounts based out of the U.S. versus those based out of France. Deletion rules may also differ if an account is closed in good standing versus with an outstanding balance due.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
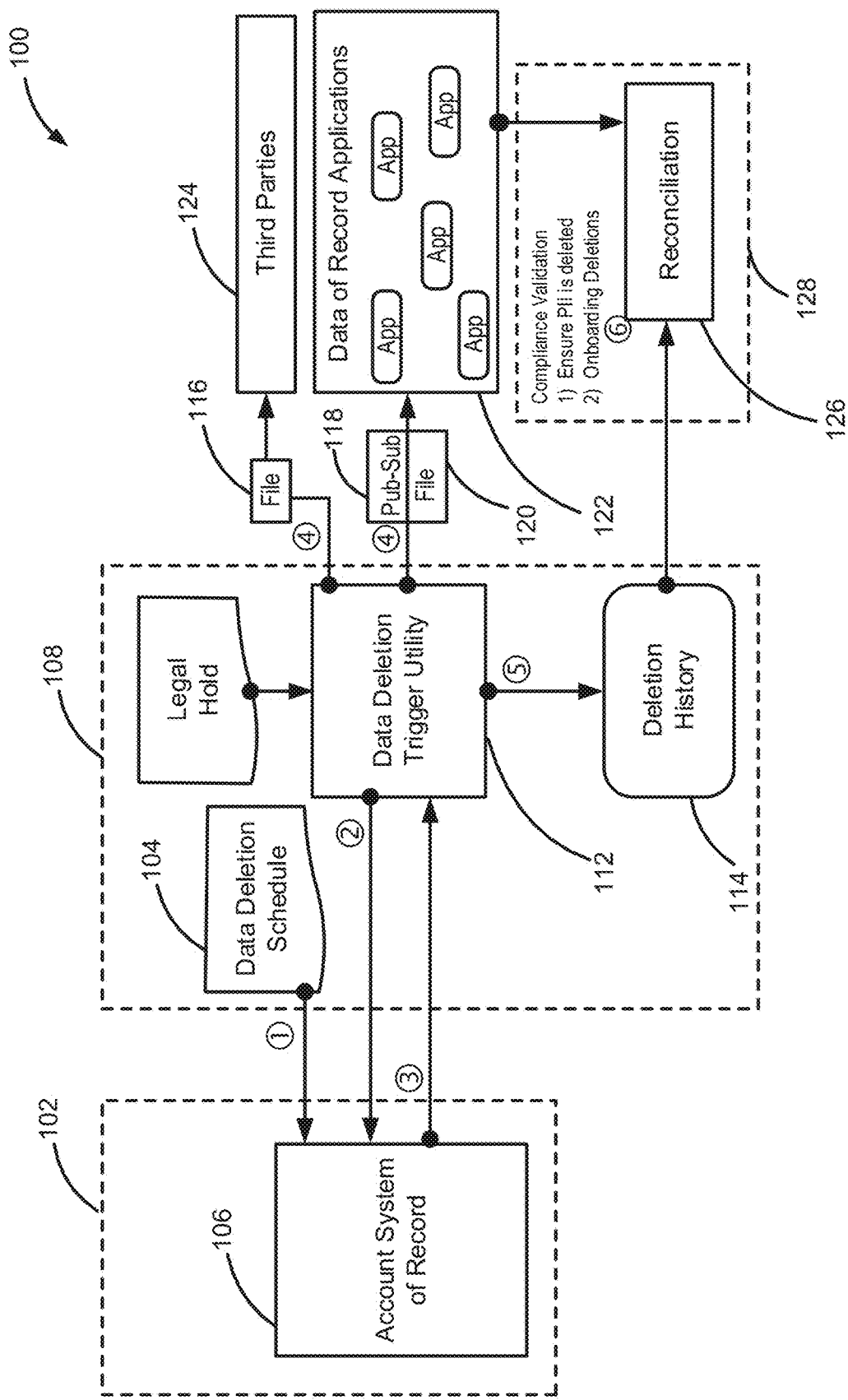
FIG. 1 illustrates an exemplary system architecture for a data deletion system configured to trigger data deletion across various data stores, in accordance with various embodiments.

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Data deletion systems and methods may operate as a centralized utility to oversee deletion of sensitive data. Various systems of record (SOR), applications and/or third parties may register with the centralized data deletion system. The data deletion system may then propagate delete messages across the SORs, applications, third parties, cloud storage systems, data stores, and/or big data systems to trigger deletion of certain data (e.g., personally identifiable information (PII)) across some or all markets. The centralized system may also provide oversight functions across a data ecosystem to ensure data compliance at the local market level.

An SOR may be a data storage system acting as the authoritative source on certain data. For example, an SOR may be an authoritative source for account status and account deletion dates based on schedules. An SOR may operate in a big data environment, for example. As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record. Various subsystems may read data from an SOR and make local copies to support various applications and/or third party interaction. Various subsystems may also collect data that is provided to the SOR for ingestion and storage.

The data deletion system may be implemented using a centralized utility. The centralized utility may enable users to enter and store deletion rules by market, creating a single source for deletion rules. The data deletion utility may identify legal holds and other deletion exclusions to ensure the correct data is retained or deleted. The data deletion utility may publish pre-deletion and deletion messages to applications to notify applications of upcoming deletions and trigger the actual deletion. The utility may also monitor deletion progress and alert compliance officers using compliance reporting and dashboards.

Phrases and terms similar to "internal data" and "PII" may include any identifying or sensitive data related to an individual, merchant, vendor, small business, corporation, or other entity. For example, data that a credit issuer possesses or acquires pertaining to a particular consumer. Internal data may be gathered before, during, or after a relationship between the credit issuer and the transaction account holder (e.g., the consumer or buyer). Such data may include demographic data pertaining to a consumer, merchant, vendor, small business, corporation, or other entity. For example, consumer demographic data may include consumer name, address, telephone number, email address, employer, social security number and company name. Consumer transactional data is any data pertaining to the particular transactions in which a consumer entity engages during any given period. Consumer transactional data may include, for example, transaction amount, transaction time, transaction vendor/merchant, and transaction vendor/merchant location. Direct access to internal data may be restricted by systems of the present disclosure, although access to rolled-up data based on market segments may be leveraged to generate actionable insights.

Referring now to FIG. 1, a schematic diagram of data deletion system 100 is shown according to various embodiments. The schematic diagram generally describes the operations performed by data deletion system 100, and the subsequent figures and description will describe these operations in greater detail.

In various embodiments, data deletion system 100 may determine accounts eligible for deletion in block 102. Any type of data may be used with the system, but the system is described with the use of transaction accounts and associated PII as exemplary types of data. However, the data deletion systems may trigger data deletion, regardless of origin of such data. For example, the data deletion systems may operate to orchestrate deletion of PII data collected incident to medical procedures, collected subject to terms and conditions, or otherwise subject to rules or agreements regarding data deletion. The process may include data deletion schedule 104 publishing deletion rules applicable to an SOR 106 in a particular market (Step 1). Accounts may be eligible for deletion in response to a client closing an account, a predetermined duration passing without account activity, a predetermined duration passing since a client closing an account, an individual or entity requesting deletion, or other criteria resulting in data deletion. Accounts may also be eligible for deletion at varying times based in part on account status, for example, if the account was closed in good standing, if payments have been made on the closed account, or if the account is in legal collections. The deletion rules applicable to SOR 106 may comprise a list of accounts to be deleted, a list of deletion rules for identifying accounts for deletion, or other suitable descriptions identifying data to be deleted.

Data deletion system 100, SOR 106, and/or applications 122 may be implemented on one or more computing devices in communication with various applications, SORs, and third parties over a network. For example, data deletion system 100 may operate on computing devices such as computing nodes, distributed computing systems, application servers, personal computers, laptops, tables, smartphones, IoT devices, smart wearables, or other devices suitable for interfacing with data deletion system 100 over a network. A communication network may be local area network using TCP/IP communication, for example, or a wide area network incorporating communication over the Internet. The communication network may also be an internal network isolated from the Internet In various embodiments, data deletion trigger utility 108 may inform SOR to apply and/or remove legal holds 110 from identified records and/or accounts in the SOR (Step 2). The legal holds may be maintained as a list of records identifiable by a key field such as, for example, an account number or other unique identifier. Legal holds may be applied and removed by adding and removing the unique identifiers corresponding to data to be preserved to and from a list of holds. Data deletion trigger utility 108 may override a scheduled deletion if the utility has schedule rules to extend the retention (e.g., legal holds, court collections cases, etc.). The rules for data deletion may not support record retention. In various embodiments, a data deletion rule may dictate demographic data be deleted, but a record retention may dictate retention in conflict with the data deletion rule. Data deletion trigger utility 108 may remove such data from the operational environment and isolate the data in a walled-off environment used for record retention.

In various embodiments, SOR may apply deletion rules to an account to determine whether an account qualifies for deletion. The SOR may inform the data deletion utility that the account meets the SOR application criteria for deletion. Data deletion trigger utility 108 may override the SOR based on reasons for extending retention such as legal holds. SOR 106 may delete the records identified by data deletion schedule 104. Deletion of identified records may include scrambling or masking fields containing PII data and leaving the record in place without discernable PII data. Masking may be an irreversible and anonymizing process applied to data, and may enable analytics of a population without retaining customer demographic data. Deletion of identified records may also include completely removing a record from the storage location. Data may also be overwritten with random, repetitive (e.g., AAA) or fixed strings (e.g., deleted) to allow for removal of demographic data and retention of non-sensitive data. The data deletion trigger utility 108 may store the data masking or deletion technique and validate effective use of the technique during reconciliation. SOR 106 may inform data deletion trigger utility 108 of records deleted (Step 3). For example, SOR 106 may write a list of unique identifiers corresponding to deleted records for data deletion trigger utility 108 to read and/or act upon. SOR 106 may communicate with data deletion trigger utility 108 and other components of data deletion system 100 using messages over messaging queues, enterprise service buses, RESTful APIs, web services, socket connections, and/or custom protocols. Solace queues are exemplary messaging queues with documentation available at http://docs.solace.com/Home.htm.

In various embodiments, an SOR may delete the data maintained for applications in response to the data no longer being used operationally in that application. The SOR may inform data deletion trigger utility 108 of such deletions. For example, a deletion rule may trigger deletion 5 years after closing an account in good standing. The SOR may delete an account 2 years after closing in good standing in response to the SOR no longer using the data. However, other applications may need to keep the data for a greater duration. Data deletion trigger utility 108 may track when a deletion should occur across an organization at the 5-year mark, and send the general delete to other systems 3 years after the earlier deletion in the SOR. Continuing the example, data deletion trigger utility 108 may track applications that delete at the same time as the SOR, and notify those applications rather than waiting for the must delete date 3 years later. Some applications may also be allowed to retain data longer than the 5-year deletion time. Data deletion trigger utility 108 may track exceptions and notify the applications at the appropriate time, even where the SOR deletes per the schedule (5 years in the above example).

In various embodiments, data deletion trigger utility 108 may communicate to internal and external SORs maintaining data corresponding to the account or records to be deleted (Step 4). The data maintained on the various internal and/or external SORs may be copied from a central data repository and reproduced to support separate applications. Thus, when data is deleted from the central repository, data deletion trigger utility 108 may trigger data deletion of appropriate records from all registered internal and/or external SORs. Communication with the various SORs may be conducted via a messaging queue. The deletion lists may be published in the form of a deletion file 120 or deletion file 116 identifying records and/or accounts for deletion. Deletion file 120 may be published to subscribed data storage systems 118 including various applications or other subscribing entities. Deletion file 116 may be published to third parties 124.

In various embodiments, third parties (and fourth parties) may process data on behalf of an organization and may thus have account information and other sensitive data without the framework to know when deletion is scheduled. To comply with deletion rules, the third party may implement a policy of aggressively deleting data prior to the deletion schedule (e.g., if the rule is life of the account plus 5 years, but the third party only receives active data, and deletes within 2 year, the third party is by its nature deleting on time). The third parties may also submit account lists for review by data deletion trigger utility 108. Data deletion trigger utility 108 may audit and verify the third parties delete and/or mask data as expected by reviewing the account lists for identifiers associated with accounts that should be deleted.

In various embodiments, data deletion trigger utility 108 may store a unique identifier associated with deleted records in deletion history 114 (Step 5). For example, the unique identifier may include an account number, account open date, account close data, and/or a deletion date. Deletion history 114 may be a file, table, or other suitable data storage format for retaining records of deleted data.

In various embodiments, compliance validation 128 may include reconciliation processes run periodically to confirm records have been deleted (Step 6). Compliance validation may also complete onboarding for subscribing SORs, applications, and/or third parties. Compliance validation 128 may thus ensure PII is deleted in response to deletion file 120 and/or deletion file 116 being published to the appropriate entities. To verify records have been deleted and/or masked, data deletion trigger utility 108 may scan data stores to identify accounts the data deletion trigger utility 108 has published to be deleted. Data deletion trigger utility 108 may track the data stores, applications, etc. that have differing schedules to avoid creating false positives.

Figure 2:
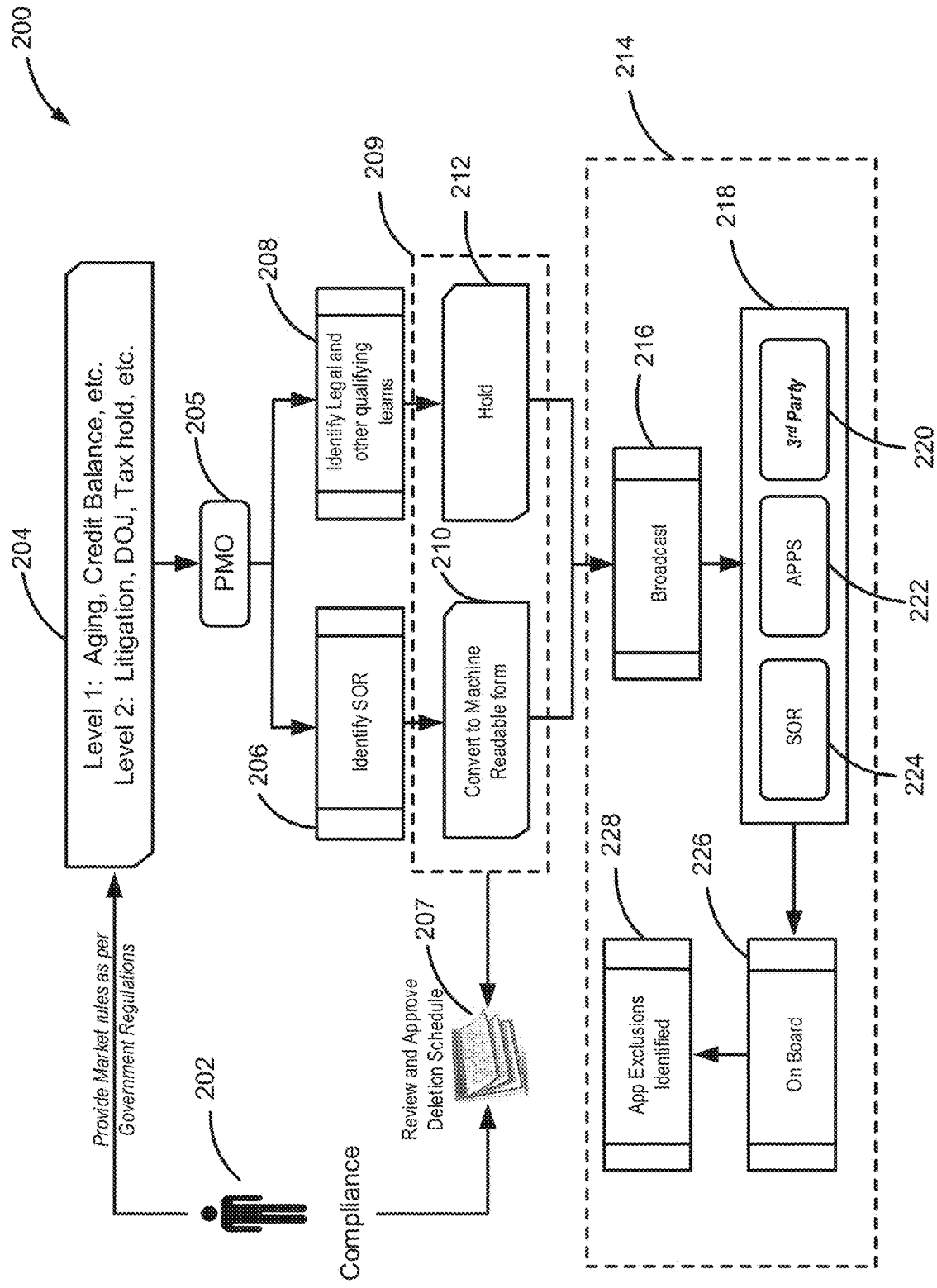
FIG. 2 illustrates an exemplary process for schedule management in a data deletion system, in accordance with various embodiments.

Referring now to FIG. 2, a flow chart depicting a schedule management process 200 for operation in data deletion system 100 is shown according to various embodiments. Schedule management process 200 may be one of multiple processes operating in data deletion system 100. A compliance team 202 may provide market rules 204 in accordance with government regulations and/or contractual terms. The market rules 204 may include, for example, rules applicable based on account factors such as aging accounts, credit balances, closing dates, or other characteristics of accounts. Market rules 204 may also include legal rules applicable based on pending litigation, requests from the Department of Justice, tax holds, or other legal basis for retaining records that may otherwise be suitable for deletion. Market rules 204 may also identify the geographical and temporal applicability of the market rules.

In various embodiments, a program management office (PMO) 205 may process market rules 204 by identifying applicable SOR 206 and identifying legal and other qualifying teams 208. The SOR 209 may convert the rules into machine-readable form 210 and insert holds 212 from legal and other qualifying teams 208. Deletion schedule 207 may be generated for review and approval by compliance team 202.

The presence of data deletion utility and market rules 204 may be broadcast 216 to various SORs 224, applications 222, and/or third parties 220. PMO 205 may one-time coordinate onboarding of various subscribing entities 218 including applications 222, SORs 224, and/or third parties 220 impacted by the market rules 204. These applications, SORs, and/or third parties may be subscribed to data deletion utility and thus on-boarded 226. Any application level exclusions 228 from market rules 204 may be identified at the time of onboarding.

Figure 3:
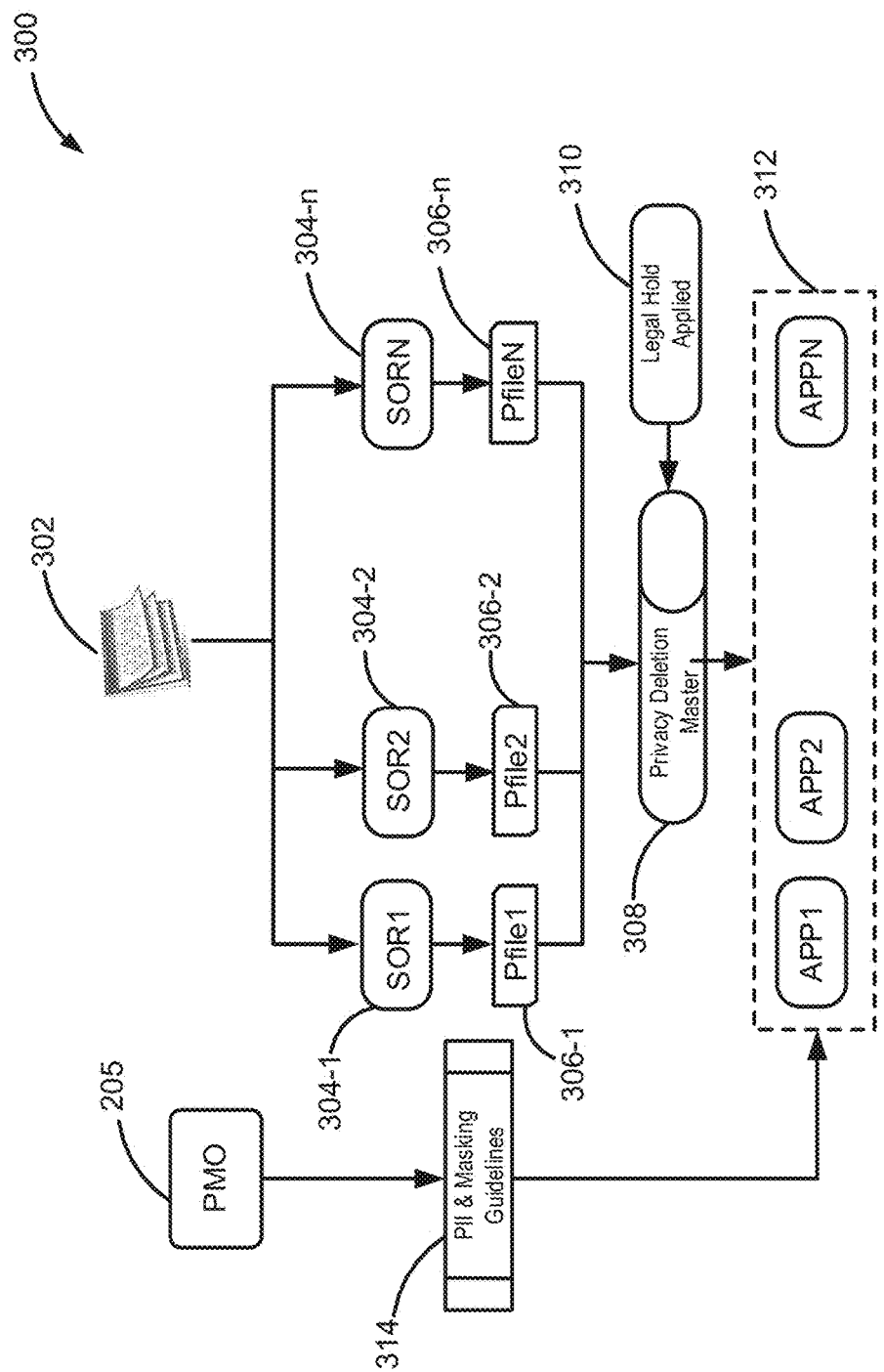
FIG. 3 illustrates an exemplary process for orchestrating a data purge in a data deletion system, in accordance with various embodiments.

Referring now to FIG. 3, a flow chart depicting an orchestration process 300 for operation in data deletion system 100 is shown according to various embodiments. Orchestration process 300 may be one of multiple processes operating in data deletion system 100. Orchestration process 300 may orchestrate the deletion of data from various SORs, data stores, and/or applications with the SORs, data stores, and/or applications performing a purge and generating appropriate records.

In accordance with various embodiments, orchestration process 300 may include a data deletion schedule 302 set according to the rules (as described in schedule management process 200 of FIG. 3). Orchestration process 300 may trigger deletion of records based on data deletion schedule 302 from SOR 304-1, SOR 304-2, and each supported SOR through SOR 304-n. Any number of SORs may be supported be data deletion system 100. Each SOR may generate purge files 306 in response to deleting records from the SOR. The purge files 306 may be generated on a per-applicable-rule basis containing unique identifiers of records deleted in response to the applicable rule. Purge files 306 may also be generated on a per-record basis, a per-data-transaction bases, or based on any other suitable dividing criteria. Purge files may identify records purged and/or rules applied in purging records from SOR 304.

In various embodiments, privacy deletion master 308 may accumulate the purge files 306 from the various SORs 304. Privacy deletion master 308 may apply holds prior to propagating delete commands to subscribing applications 312. The holds may remove records from deletion lists for subscribing applications 312. PMO 205 may generate PII deletion and/or masking guidelines for subscribing applications 312 to apply in deleting and/or masking PII data.

Figure 4:
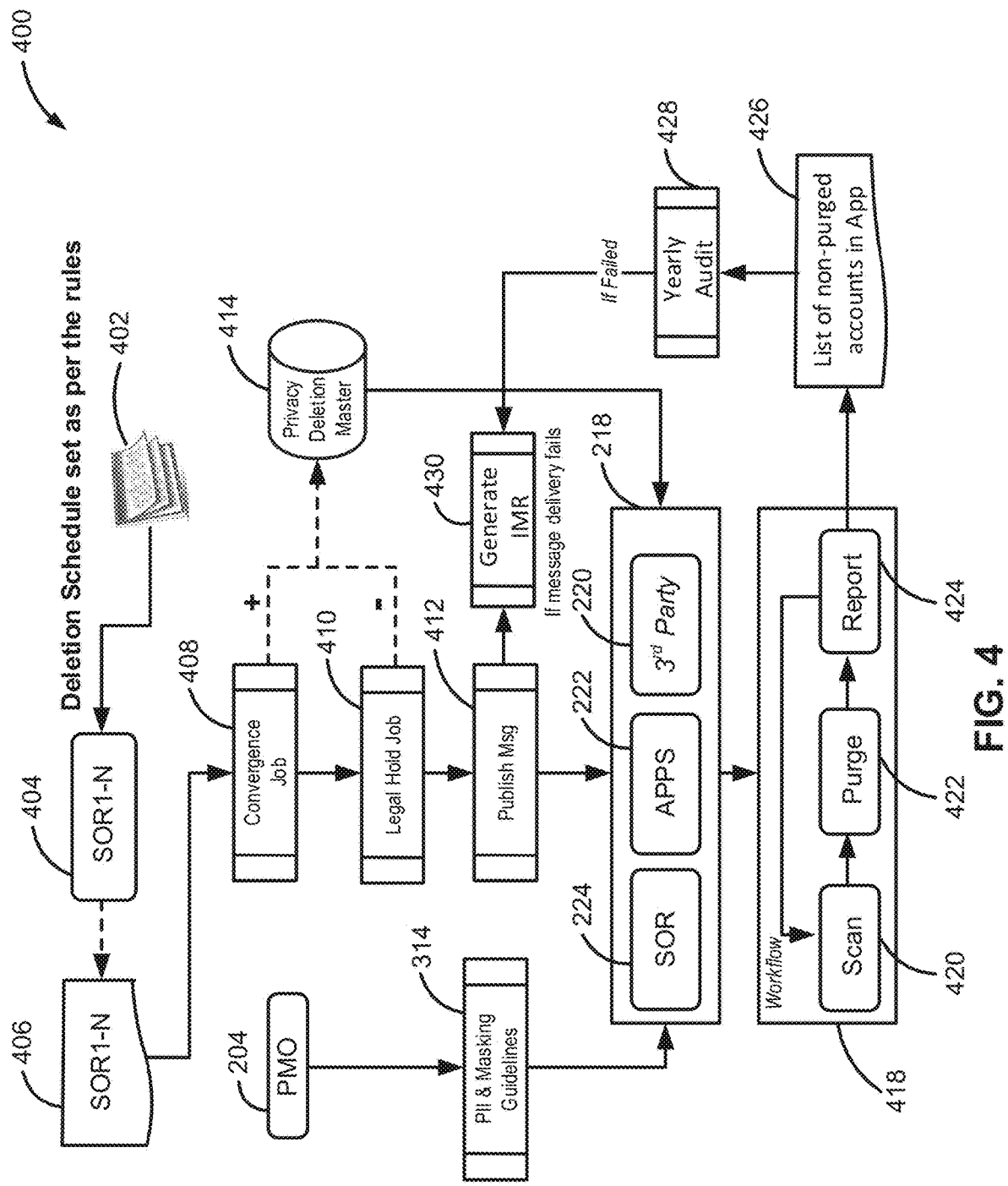
FIG. 4 illustrates an exemplary process for enforcing a data deletion policy across a various data stored, in accordance with various embodiments.

Referring now to FIG. 4, a flow chart depicting a data deletion and reconciliation process 400 for operation in data deletion system 100 is shown according to various embodiments. Deletion and reconciliation process 400 may be one of multiple processes operating in data deletion system 100. Deletion and reconciliation process 400 may track deletion of data from various SORs and reconcile actual deletions with expected deletions to generate appropriate messages. Deletion and reconciliation process 400 may thus capture the process flow from creation of rules, to purge workflow, and reconciliation/reporting.

In various embodiments, SORs 404 may run their purge tag extracts as per the deletion schedule 402. Purge tag extraction may include reading and/or writing unique identifiers corresponding to records to be purged in accordance with applicable data deletion rules. The purge tags may be written to a purge file 406 corresponding to an SOR 404. In that regard, each SOR may be configured to apply deletion rules and identify records to delete data contained within the particular SOR. The SOR may also identify the deleted data and/or PII to be deleted from subscribed SORs, applications, and/or third parties.

In various embodiments, a privacy deletion master 414 may run a convergence job 408 to converge the separate purge files from the various SORs and merge them into a unified deletion roster. The unified deletion roster may contain a list of all of the records subject to deletion based on various local market rules applicable to each SOR. The list may comprise account numbers, account identifiers, key fields, or other identifiers. Identifiers may be one-way hashed or hashed and salted, for example, to logically delete the data at the data deletion trigger utility 108, but allow audit of systems by hashing the data store accounts and comparing the result to the hash stored in data deletion trigger utility 108. The unified deletion roster may be uploaded to the privacy deletion master 414 capable of adding and/or removing records in the deletion list. Privacy deletion master 414 may also run a legal hold job 410 to apply any identified legal holds by removing records subject to a hold from the unified deletion roster.

In various embodiments, the deletion messages 412 are published to subscribing entities 218. In response to receiving a deletion message 412, subscribing entities 218 may perform a purge 418 by scanning 420 a message queue for a deletion message 412, purging 422 PII data by deleting and/or masking the PII data identified by the deletion message 412, and reporting 424. Deletion of data by subscribing entities 218 may be tracked indirectly by monitoring a messaging queue used to transmit deletion messages 412 to the subscribing entities. For example, a privacy deletion master 414 may determine whether messages in a queue are being appropriately consumed by subscribing entities 218. Subscribing entities 218 may be configured to consume messages in response to successful deletions.

In various embodiments, reporting may include generating a list of non-purged records and/or accounts in data stores maintained by and/or for subscribing entities 218. If deletion messages 412 in the pub-sub queue are not consumed (expired) then an incident record and alert (IRA) is generated against that application. A periodic audit 428 may be conducted to check if applications have purged all records listed in deletion messages 412. If non-deleted records exist, an alert may be generated in the form of an IRA or trouble ticket, for example. The alerts may be monitored and responded to in overseeing data deletion at subscribing entities 218.

Figure 5:
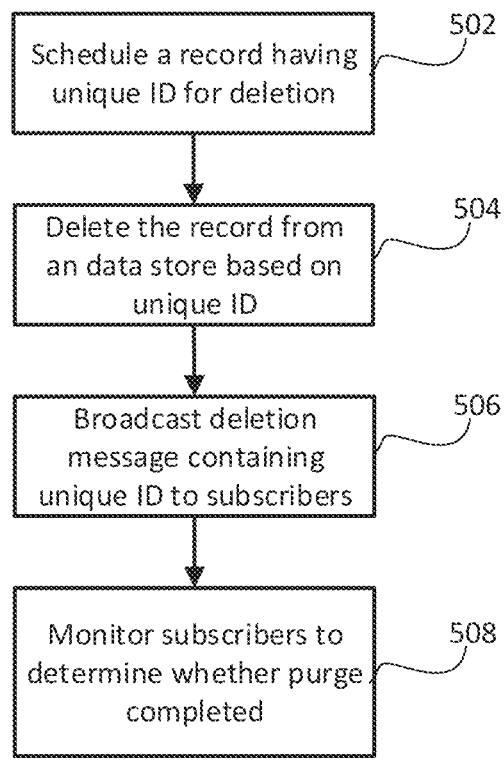
FIG. 5 illustrates an exemplary process for execution by a data deletion system to trigger and orchestrate data deletion across a variety of data stores, in accordance with various embodiments.

Referring now to FIG. 5, an exemplary process 500 is shown for execution by data deletion system 100 to trigger and orchestrate data deletion across a variety of data stores, in accordance with various embodiments. The data deletion system 100 may schedule a record having a unique identifier for deletion in response to a data deletion rule (Block 502). The unique identifier may include, for example, an account number associated with a transaction account.

In various embodiments, the record may be deleted from a data store based on the unique identifier (Block 504). The system may also apply a hold to the record using the unique identifier to prevent deletion of the record. The system may broadcast a deletion message containing the unique identifier (Block 506). Broadcasting the deletion message may include writing the deletion message to a messaging queue. The deletion message may trigger a purge of data associated with the unique identifier by a subscribing entity such as, for example, an application or third party.

In various embodiments, the system may monitor the subscribing entity to determine whether the purge was successfully completed (Block 508). The system may monitor the messaging queue to detect consumption of the deletion message from the messaging queue. An alert may be generated in response to the deletion message remaining in the messaging queue. The system may also receive a list of unique identifiers associated with non-purged records retained by the subscribing entity. An alert may be generated in response to failure of a periodic audit to trigger further action. The system may further store a history comprising the unique identifier associated with the purged data.

In various embodiments, the system components described herein may be organized to communicate and interact in various manners. For example, an account SOR may decide when an account should be deleted based on a deletion schedule. The SOR may delete and notify the data deletion trigger utility. The data deletion trigger utility may send deletion messages for those accounts to downstream systems, and may later reconcile deletions.

In various embodiments, an account SOR may delete data before a deletion rule applies to the data, for example, when the SOR is finished using the account for operational reasons. The account SOR may communicate the deletion to the data deletion trigger utility. The data deletion trigger utility may track when an account should be deleted by downstream systems, and send the appropriate delete messages at the appropriate future time based on the deletion schedule. Some applications may receive a message from the SOR or the data deletion trigger utility, if the application does not have continued use for the data about the account when the SOR deletes (e.g., the account can no longer transact). There may be other applications receive a deletion message sometimes after the account SOR deletes, but before the deletion schedule says the deletion is required based on regulations.

In various embodiments, the data deletion trigger utility may scan the SOR for conditions, based on the deletion schedule, that indicates that the account data should be deleted. The data deletion trigger utility may send deletion messages to all data stores, account SORs, applications, in response to identifying accounts for deletion. In a consolidated environment, such as big data, the consolidated environment may scan the data for accounts that should be deleted, and inform the data deletion trigger utility of the accounts eligible for deletion. The data deletion trigger utility may send delete messages to the data stores, account SORs, applications in response to receiving the accounts for deletion. The data deletion trigger utility may also confirm compliance.

In various embodiments, the SOR may identify when to delete and inform the downstream systems. The data deletion trigger utility may also be informed by the SOR, and, since the SOR sent the deletion messages downstream, the data deletion trigger utility may audit the downstream systems to ensure the subscribing systems are meeting the requirements.

In various embodiments, subscribing systems may periodically pull the list of accounts that have been deleted and self-validate that the subscribing system is compliant. The subscribing systems may also delete any records that should be deleted. Stated another way, the subscribing systems may receive a full historical list of deleted accounts rather than receiving the current deletion messages. The downstream systems may thus trigger deletions from a full list including historic deletions, from a partial list including new deletions, or from individual deletion messages.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of triggering data deletion, but the disclosure and claims include specific rules for implementing the outcome of triggering data deletion and that render information into a specific format that is then used and applied to create the desired results of triggering data deletion, as set forth in *McRO. Inc.* v. *Bandal Namco Games America Inc.* (Fed. Cir. case number 15-1080, Sep. 13, 2016). In other words, the outcome of triggering data deletion can be performed by many different types of rules and combinations of rules, and this disclosure includes various embodiments with specific rules. While the absence of complete preemption may not guarantee that a claim is eligible, the disclosure does not sufficiently preempt the field of triggering data deletion at all. The disclosure acts to narrow, confine, and otherwise tie down the disclosure so as not to cover the general abstract idea of just triggering data deletion. Significantly, other systems and methods exist for triggering data deletion, so it would be inappropriate to assert that the claimed invention preempts the field or monopolizes the basic tools of triggering data deletion. In other words, the disclosure will not prevent others from triggering data deletion, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations; scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer.

This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Various processes of data deletion system 100 may run on distributed computing cluster, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer systems also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the servers may include application servers (e.g. WEB SPHERE, WEB LOGIC, JBOSS, EDB® Postgres Plus Advanced Server® (PPAS),etc.). In various embodiments, the server may include web servers (e.g. APACHE, IIS, GWS, SUN JAVA® SYSTEM WEB SERVER). For example, a PMO or compliance team may interact with an application server to set local market rules and approve deletion schedules.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLAV® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system, data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFTI® Transaction Server (MTS), and MICROSOFT, SQL Server, are used in conjunction with the MICROSOFT® operating system, MICROSOFT,® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES; A ROADMAP FOR THE ENTERPRISE (2003), hereby incorporated by reference. For example, representational state transfer (REST), or RESTful, web services may provide one way of enabling interoperability between applications.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA), JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references; (1) "Applied Cryptography; Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security; Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   scheduling, by a data deletion system, a record having an identifier on a schedule for deletion in a first market, based on a first data deletion rule;
   broadcasting, by the data deletion system and to a first subscribing entity, a deletion message containing the identifier and the schedule, wherein the deletion message is configured to trigger the first subscribing entity to purge data associated with the identifier in the first market based on the schedule, wherein the data includes a first subset of the data and a second subset of the data;
   overriding, by the data deletion system, the schedule for the deletion of the second subset of the data based on a record retention rule; and
   monitoring, by the data deletion system, the first subscribing entity to determine whether the purge of the first subset of the data was successfully completed.

2. The method of claim 1, wherein the broadcasting further comprises writing the deletion message to a messaging queue.

3. The method of claim 2, wherein the monitoring further comprises monitoring the messaging queue to detect consumption of the deletion message from the messaging queue.

4. The method of claim 3, further comprising generating, by the data deletion system, an alert in response to the deletion message remaining in the messaging queue.

5. The method of claim 1, further comprising applying, by the data deletion system, a hold to a second record having a second identifier to prevent the deletion of the second record in response to the first data deletion rule.

6. The method of claim 1, further comprising:
   receiving, by the data deletion system, a first list of identifiers associated with non-purged records retained by the first subscribing entity; and
   comparing, by the data deletion system, the first list of identifiers associated with the non-purged records to a second list of identifiers from deletion messages to identify improper record retention.

7. The method of claim 6, further comprising:
   hashing, by a data deletion trigger utility of the data deletion system, a first plurality of identifiers to generate the first list of identifiers; and
   hashing, by a data store of the data deletion system, a second plurality of identifiers to generate the second list of identifiers.

8. The method of claim 1, further comprising receiving, by the data deletion system and from a second subscribing entity, a second data deletion rule for a second market.

9. The method of claim 1, wherein the identifier comprises an account number associated with a transaction account.

10. The method of claim 1, further comprising generating, by the data deletion system, an alert in response to an audit.

11. The method of claim 1, further comprising storing, by the data deletion system, a purge history including the identifier associated with the purge of the first subset of the data.

12. The method of claim 1, wherein the data deletion rule triggers deletion of an account in response to characteristics of the account, wherein the characteristics include at least one of standing of the account, a closure date of the account, a legal hold of the account, a duration passing without activity on the account, a duration passing since the closure date of the account, a request for the deletion, the account being closed in good standing, the account being in legal collections, a payment after closure, or an amount owed at a closure of the account.

13. The method of claim 1, further comprising deleting, by a system of record in the data deletion system, the record having the identifier in response to the schedule.

14. The method of claim 1, wherein the data deletion system comprises a data deletion trigger utility in electronic communication with a system of record using at least one of a messaging queue, an enterprise service bus, a RESTful API, or a web service.

15. The method of claim 1, wherein the purge of the first subset of the data comprises at least one of masking the data, deleting the data, overwriting the data, or anonymizing the data.

16. A data deletion system, comprising:
a processor; and
a tangible, non-transitory memory configured to communicate with the processor, the tangible, non-transitory memory having instructions stored thereon that, in response to execution by the processor, cause the data deletion system to perform operations comprising:
scheduling, by the data deletion system, a record having an identifier on a schedule for deletion in a first market, based on a first data deletion rule;
broadcasting, by the data deletion system and to a first subscribing entity, a deletion message containing the identifier and the schedule, wherein the deletion message is configured to trigger the first subscribing entity to purge data associated with the identifier in the first market based on the schedule, wherein the data includes a first subset of the data and a second subset of the data;
overriding, by the data deletion system, the schedule for the deletion of the second subset of the data based on a record retention rule; and
monitoring, by the data deletion system, the first subscribing entity to determine whether the purge of the first subset of the data was successfully completed.

17. The method of claim 1, further comprising notifying, by the data deletion system, the first subscribing entity of upcoming deletion messages.

18. The method of claim 1, further comprising notifying, by the data deletion system, a compliance officer about the monitoring.

19. The method of claim 1, wherein the first market includes at least one of a first legal jurisdiction, a first country or a first account.

20. An article of manufacture including a non-transitory, tangible computer readable storage medium having instructions stored thereon that, in response to execution by a data deletion system, cause the data deletion system to perform operations comprising:
scheduling, by the data deletion system, a record having an identifier on a schedule for deletion in a first market, based on a first data deletion rule;
broadcasting, by the data deletion system and to a first subscribing entity, a deletion message containing the identifier and the schedule, wherein the deletion message is configured to trigger the first subscribing entity to purge data associated with the identifier in the first market based on the schedule, wherein the data includes a first subset of the data and a second subset of the data;
overriding, by the data deletion system, the schedule for the deletion of the second subset of the data based on a record retention rule; and
monitoring, by the data deletion system, the first subscribing entity to determine whether the purge of the first subset of the data was successfully completed.

* * * * *